(12) United States Patent
Elbe et al.

(10) Patent No.: US 6,985,917 B2
(45) Date of Patent: Jan. 10, 2006

(54) CONFIGURABLE CALCULATING UNIT

(75) Inventors: Astrid Elbe, Munich (DE); Wieland Fischer, Munich (DE); Norbert Janssen, Munich (DE); Holger Sedlak, Lochhofen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/963,426

(22) Filed: Oct. 11, 2004

(65) Prior Publication Data

US 2005/0114425 A1    May 26, 2005

Related U.S. Application Data

(63) Continuation of application No. PCT/EP03/03608, filed on Apr. 7, 2003.

(30) Foreign Application Priority Data

Apr. 10, 2002   (DE)   ................ 102 15 771

(51) Int. Cl.
  *G06F 7/38*  (2006.01)

(52) U.S. Cl. .................................. 708/230

(58) Field of Classification Search ................ 708/230
  See application file for complete search history.

(56) References Cited

U.S. PATENT DOCUMENTS

| 5,021,690 A | * | 6/1991 | Linz ........................... 326/39 |
| 6,078,941 A | | 6/2000 | Jiang et al. |
| 6,219,740 B1 | | 4/2001 | Mabuchi |

FOREIGN PATENT DOCUMENTS

| DE | 36 31 992 C2 | 11/1987 |
| WO | WO-99/10802 A1 | 3/1999 |
| WO | WO-99/44329 A2 | 9/1999 |
| WO | WO-01/44928 A1 | 6/2001 |

OTHER PUBLICATIONS

James Goodman, et al., "Energy-Efficient Reconfigurable Public-Key Cryptography Processor", IEEE Journal of Solid-State Circuits, Nov. 2001, vol. 36, No. 11, pp. 1808-1820.

* cited by examiner

*Primary Examiner*—Tan V. Mai
(74) *Attorney, Agent, or Firm*—Darby & Darby

(57)   ABSTRACT

A calculating unit includes a first calculating unit block, a second calculating unit block, controller, and connector having connecting lines, wherein for each elementary cell having a same significance in the first calculating unit block and the second calculating unit block an individual connecting line is provided to achieve a quick register exchange by means of the controller of the calculating unit blocks operating in parallel.

13 Claims, 5 Drawing Sheets

CONFIGURABLE CALCULATING UNIT

CROSS-REFERENCE TO RELATED APPLICATION

This application is a continuation of copending International Application No. PCT/EP03/03608, filed Apr. 7, 2003, which designated China, Japan, the Russian Federation and the United States, was not published in English and is incorporated herein by reference in its entirety.

BACKGROUND OF THE INVENTION

1. Field of the Invention

The present invention relates to calculating units and, in particular, to long number calculating units configurable with respect to their length.

2. Description of Prior Art

DE 3631992 T2 discloses a cryptography processor for efficiently embodying the public key method by Rivest, Shamir and Adleman, which is also known as the RSA method. The modular exponentiation required in this method is calculated using a multiplication look-ahead method and a reduction look-ahead method. For this, a three-operands adder is used. The three-operands adder disclosed has a length of 660 bits. An elementary cell consists of several cryptoregisters, a shifter, a half adder, a full adder and a carry look-ahead element. Four such elementary cells form a four-cells block, a carry look-ahead element being associated to the four-cells block. Five such four-cells blocks form a 20-cells block. The encryption unit consists of a total of 33 such 20-cells blocks and a control unit including a clock generator for clocking the elementary cells. The carry look-ahead elements of the four-cells blocks are interconnected to recognize whether a carry propagates over a greater distance, that is 20 bits. When a propagate signal of the 20-bits block is active, this means that the carry of the 20-bits block considered depends on a carry at the output of the previous block. When the propagate signal of a 20-bits block, however, is not active, this means that a carry maybe present at the output of this block, that is at the most significant bit of this block, has been produced within this block, is, however, not influenced by the previous block.

Thus, it is possible to make the clock of the calculating unit, that is the rate at which new input operands are fed, faster than the worst case in which the carry path is from the least significant bit of the entire calculating unit to the most significant bit of the entire calculating unit. If a propagate signal for a 20-bits block is activated, the clock of the entire calculating unit is slowed down such that the worst case is taken into account, that is the calculating unit is stopped until a carry has propagated from the least significant bit of the entire calculating unit to the most significant bit of the entire calculating unit.

The cycle time, that is the time after which next input operands are fed into the calculating unit, is thus adjusted such that it is just sufficient to process the carry of directly neighboring blocks. This has the advantage that, irrespective of the number of digits of the calculating unit, only the time of a block carry has to be taken into account. When it is, however, determined that the carry of the current block is not only impeded by the previous block but also by the block preceding the previous block, the cycle time is made so slow that there is sufficient time for a complete carry path.

FIG. 4 shows an elementary cell for a bit i of the well-known calculating unit. The elementary cell includes several registers for several input operands, of which only two register cells 110, 112 are shown in FIG. 4. An elementary cell further includes adding means 114 and a register cell for a result which, in FIG. 4, is designated by 116. It follows from the relatively high number of components within an elementary cell, as can be seen from FIG. 4, that such an elementary cell, in its practical realization, has a relatively low height h but a relatively large width d. Due to the fact that 660 such elementary cells must be stacked one above the other, a narrow high tower nevertheless results. From a manufacturing point of view, chips which have a squared form to the largest extent possible are sought so that the narrow high tower can be divided into several small stacks which are placed next to one another, wherein every other stack is upside down. The information a stack needs from the previous stack is transmitted to the neighboring stacks at the upper and lower sides of the stack.

Certain cryptographic algorithms can be processed in parallel by means of two parallel operating calculating units in order to reduce the processing time. Certain algorithms, when they are, for example, iterative, require that the contents in the result register of the one calculating unit is loaded into an operands register of the other calculating unit.

Such a situation is illustrated in FIG. 3. In FIG. 3, a first long number calculating unit 91 and a second long number calculating unit 92 are illustrated. Each calculating unit includes a number of elementary cells 90, wherein each elementary cell can be constructed as is shown in FIG. 4. The number of elementary cells in each long number calculating unit is the same and equals n. Depending on the case of application calculating units have different lengths. The calculating unit described in DE 36 312 992 C2 has a length of 660 bits. If two such encrypting operations were to be executed in parallel, two 660-bits long number calculating units would be used.

For elliptical curve cryptography, a sufficient security is already obtained when secret keys having a length of, for example, 160 bits are used. Such a calculating unit would thus have to have a minimal width of 160 bits. For RSA cryptosystems, there are implementations with a high-security level, in which the module has 1024 digits. High-security RSA systems, however, have modules with 2048 digits. For parallel applications, for example two 1024-bits calculating units or two 2048-bits calculating units would have to be connected in parallel.

In order to load the contents in a result register of, for example, the long number calculating unit 1 (91 in FIG. 3) into an input operand register of the long number calculating unit 2 (reference numeral 92 in FIG. 3), a first bus interface (bus IF), a second bus interface (bus IF) 94 and a bus 95 having a width of, for example, 32 bits could be used. The bus interface 93 would thus include the block-by-block read out of 32-bits blocks from the long number calculating unit 1. Each 32-bits block is then transmitted to the bus interface 94 via the bus 95 one after the other, wherein the bus interface 94 causes the incoming 32-bits blocks to be loaded into the correct elementary cells of the long number calculating unit. For a 660-bits calculating unit, more than 20 cycles are required for this, each cycle including the following steps: addressing 32 elementary cells in the source long number calculating unit, reading out the 32 elementary cells in the source long number calculating unit, transmitting the 32 bits via the bus, addressing the 32 elementary cells in the destination long number calculating unit and storing the 32 bits into the addressed 32 elementary cells of the long number calculating unit.

The access of a calculating unit to a register of the other calculating unit thus takes place by a previous explicit exchange of operands via the bus system to which the two calculating units are connected. As a standard, this bus has a width of 32 bits. It can, however, also have a width of only 8 bits, depending on the system present. The exchange thus takes a long time in long number calculating units and in particular in serial-parallel long number calculating units. In addition, a security problem often arises since the data transfer can, for example, be seen in the current profile.

It is an object of the present invention to provide a more efficient and securer calculating unit.

SUMMARY OF THE INVENTION

The present invention provides a calculating unit having a first calculating unit block having a first plurality of elementary cells including an LSB elementary cell for a least significant bit of a first operand and an MSB elementary cell for a most significant bit of the first operand, each elementary cell of the first calculating unit block having at least one register cell for storing a bit of the first operand or a result bit calculated by the elementary cell, the first calculating unit block having at least four partial calculating unit blocks; a second calculating unit block having a second plurality of elementary cells including an LSB elementary cell for a least significant bit of a second operand and an MSB elementary cell for a most significant bit of the second operand, each elementary cell of the second calculating unit block having a register cell for storing a bit of the second operand or a result bit calculated by the elementary cell, the second calculating unit block having at least four partial calculating unit blocks, wherein the first and second calculating unit blocks are arranged to each other in space such that a space distance between an elementary cell of the first calculating unit block and a same significance elementary cell of the second calculating unit block is smaller than a mean distance between the elementary cell of the first calculating unit block and different significance elementary cells of the second calculating unit block, wherein a partial calculating unit block of the second calculating unit block is arranged between two partial calculating unit blocks of the first calculating unit block, and wherein a direction from a least significant bit to a most significant bit of the partial calculating unit block of the second calculating unit block is the same direction from a least significant elementary cell to a most significant elementary cell of a neighboring partial calculating unit block of the first calculating unit block, wherein a direction from a least significant elementary cell to a most significant elementary cell of the partial calculating unit block of the second calculating unit block is opposite to a direction from a least significant elementary cell to a most significant elementary cell of the other neighboring partial calculating unit block of the first calculating unit, and connecting means having a number of connecting lines equaling the number of elementary cells in a calculating unit block, wherein a connecting line connects the at least one register cell of an elementary cell having a significance of the first calculating unit block to a register cell of an elementary cell having the same significance of the second calculating unit block, wherein the connecting lines are arranged between the two partial calculating unit blocks having the same direction from a least significant elementary cell to a most significant elementary cell of the partial calculating unit blocks; and controlling means for loading contents of the register cells of a calculating unit block via the number of connecting lines into the register cells of the other calculating unit block.

The present invention is based on the recognition that the register exchange between two long number calculating units can be accelerated when a first calculating unit block is arranged next to a second calculating unit block, wherein a distance between one elementary cell of the first calculating unit block and a same significance elementary cell of the second calculating unit block is smaller than a mean distance between the same elementary cell of the first calculating unit block and at least two different significance elementary cells of the second calculating unit block. The calculating unit blocks are interconnected via connecting means having a number of connecting lines, wherein the number of connecting lines equals the number of elementary cells in a calculating unit block, wherein a connecting line interconnects the at least one register cell in an elementary cell of the first calculating unit block to at least one register cell of an elementary cell according to the significance in the second calculating unit block, and wherein controlling means is further provided to load the contents of the register cells of a calculating unit block via the connecting lines into the register cells of the other calculating unit block.

It is an advantage of the present invention that a register exchange between the two parallel operating calculating units takes place quickly since only one cycle is required for this.

A further advantage of the present invention is that, since the two parallel calculating units are arranged next to each another so that elementary cells in the two calculating units having the same significance are arranged next to each another, the connecting lines are short and it is thus difficult to intercept them by, for example, probe attacks since a probe attack takes place the more easily, the more extensive the line to be attacked is.

It is a further advantage of the present invention that the current profile is homogenous, in particular in long number calculating units, in the data transmission since a plurality of bits which are independent of one another are transmitted.

It is a further advantage of the present invention that the calculating unit can easily be made more flexible in that the two calculating units arranged in parallel can be reconfigured to a single calculating unit having double the length by enabling a carry path between the carry output signal of the MSB of the first calculating unit with a carry input of the LSB of the second calculating unit block. Put differently, this means that a very long long number calculating unit can be easily reconfigured to 2, 4 etc. parallel operating calculating units having a small length by influencing the carry path between two calculating unit blocks (or several calculating unit blocks). This feature is of especial advantage for a multi-purpose cryptoprocessor since different calculating unit lengths are required for certain cryptographic tasks. In elliptical curve cryptography, key lengths in the order of magnitude between 150 and 180 bits, preferably 160 bits, are sufficient in order to produce a sufficient security. The sufficient security, is, however, only obtained in a conventional RSA cryptosystem when key lengths of 1024 bits of, in recent times, even 2048 bits are used, which has the immediate result that for an efficient processing of the cryptosystem long number calculating units having a length of more than 1024 or more than 2048 bits are required.

On the other hand, especially in cryptoprocessors which are to be accommodated on SmartCards in a chip form, the chip area requirement is preset externally and tight. Thus there is the object to accommodate the components required for the cryptoprocessor, such as, for example, calculating unit and memory etc., in a chip having a preset size. The requirements for the chip area have the result that it is of advantage not to provide a different calculating unit for each cryptographic algorithm but to use the same calculating units for, if possible, all the cryptographic algorithms. On the other hand, the different key length, and thus the greatly different calculating unit length, is an essential distinguishing criterion of the cryptography algorithms.

The inventive configurability of the calculating unit length by means of providing carry paths between two calculating unit blocks and by providing configuring means in order to connect through the calculating unit path when a long calculating unit is required or to interrupt the carry path when several parallel short calculating units are required provides the advantage that a calculating unit can be used for several applications and that in addition, when shorter key lengths are present, a part of the calculating unit is not simply disabled but can operate as a second parallel calculating unit which can perform a quick register exchange with the first calculating unit.

In order to be able to accommodate the inventive calculating unit on a chip, that is an integrated circuit, having a preset geometry, each calculating unit block, according to the invention, is divided into partial calculating unit blocks, wherein the partial calculating unit blocks are arranged in an interleaved way such that between two partial calculating unit blocks of the first calculating unit block there is always a partial calculating unit block of the second calculating unit block, and wherein the partial calculating unit blocks of the first and second calculating unit blocks are arranged in such a way that elementary cells having the same significance have the smallest possible distance between each another. This results in an interleaved double meander structure. The meanders of the two parallel calculating unit blocks are thus arranged in an alternating way. After the first meander tower of the one calculating unit, the first meander tower of the other calculating unit block follows, wherein the latter is mirrored geometrically in order to obtain the short distances between elementary cells having the same significance when the two calculating unit blocks are operated in parallel to each other. The interlocking meandering arrangement of the calculating unit blocks also enables the case in which the calculating unit blocks are connected to an overall calculating unit having double the length by activating the carry path.

BRIEF DESCRIPTION OF THE DRAWINGS

Preferred embodiments of the present invention will be detailed subsequently referring to the appended drawings, in which.

DESCRIPTION OF PREFERRED EMBODIMENTS

Figure 1:
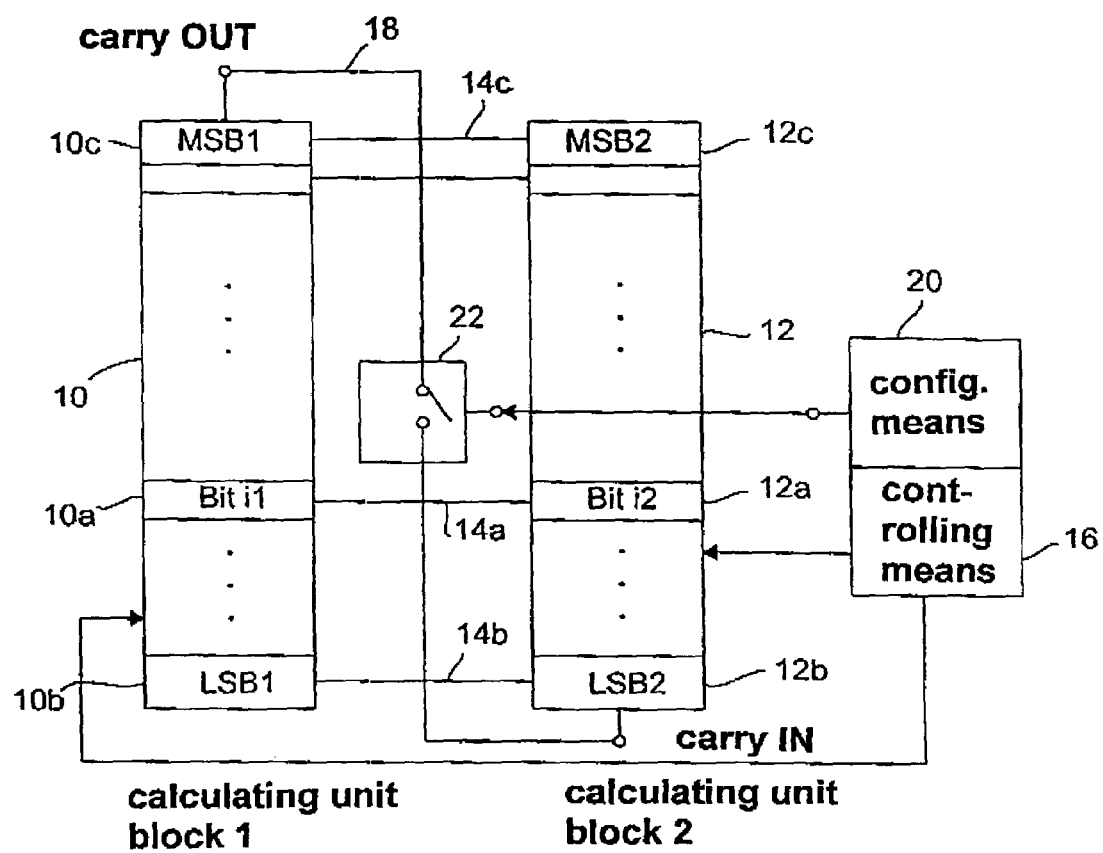
FIG. 1 is a block diagram of the inventive calculating unit.
Figure 4:
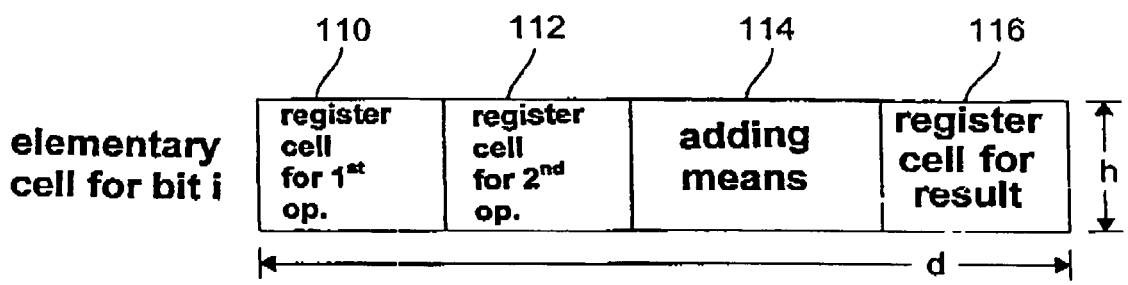
FIG. 4 is a schematic illustration of an elementary cell for a bit i in a long number calculating unit.

FIG. 1 shows a block diagram of a preferred embodiment of the inventive calculating unit. The calculating unit includes a first calculating unit block 10 and a second calculating unit block 12. Each calculating unit block itself in turn includes a plurality of elementary cells 10a and 12a, respectively, as well as an elementary cell for a least significant bit 10b and 12b, respectively, and an elementary cell for a most significant bit 10c and 12c, respectively. The elementary cell 10b for the least significant bit of the calculating unit 10 is also referred to as the LSB1 elementary cell. The elementary cell for the most significant bit of the calculating unit 1 is also referred to as the MSB1 elementary cell. Analog designations are selected for the second calculating unit block 12, wherein the expression "LSB" stands for least significant bit, and wherein the expression "MSB" stands for most significant bit. Each of the elementary cells 10a, 10b, 10c, 12a, 12b, 12c shown in FIG. 1 can basically be constructed as is shown in FIG. 4. It is to be pointed out that each elementary cell includes more or fewer register cells for the operands to be processed by the adding means of an elementary cell or more or fewer register cells for one or several results. In order to obtain a quick register exchange between the two calculating units, each calculating unit block must, however, have elementary cells having at least one register cell for storing a bit of an operand to be processed by the calculating unit block.

The calculating unit shown in FIG. 1 further includes connecting means having a number of connecting lines 14a, 14b, 14c, wherein each connecting line interconnects two elementary cells having the same significance in the two calculating unit blocks. Thus the connecting line 14a connects the elementary cell for the bit i of the first calculating unit block, which, in FIG. 1, is designated by 10a, to an elementary cell for a bit i of the second calculating unit block 12, which, in FIG. 1, is designated by 12a. By way of analogy, the connecting line connects the LSB elementary cell 10b of the first calculating unit block 10 to the LSB elementary cell 12b of the second calculating unit block. The same is true for the connecting line 14c interconnecting the two MSB elementary cells of the two calculating unit blocks.

The inventive calculating unit further includes controlling means 16 for controlling the calculating unit blocks 10, 12 so that contents of the register cells of a calculating unit block can directly be loaded into the contents of the register cells of the other calculating unit block via the connecting lines 14a, 14b, 14c for each elementary cell.

In the preferred embodiment of the present invention shown in FIG. 1, the two calculating unit blocks 10, 12 can either be operated as parallel calculating unit blocks in a certain sense independently of each other. Alternatively, the two calculating unit blocks 10 and 12 can be connected in such a way that they are operated as a single overall calculating unit having a width equaling the number of elementary cells in the first calculating unit block 10 plus the number of elementary cells in the second calculating unit block 12. This is obtained by providing a carry line 18 connecting a carry output of the MSB elementary cell of the first calculating unit block to a carry input of the LSB elementary cell of the second calculating unit block. This functionality is also obtained by configuring means 20 controlling a switch 22 to either operate the two calculating unit blocks as two parallel operating units when the switch is opened or to operate the two calculating unit blocks as a single overall calculating unit when the switch 22 is closed. The operand bits stored in the elementary cells of the first calculating unit block 10 in this case represent least significant bits of an overall operand, while the operand bits stored in the elementary cells of the second calculating unit block 12 represent more significant bits of the overall operand.

Depending on the design and the number of the elementary cells in a calculating unit block and depending on the geometry predetermination for the integrated circuit with which the calculating unit shown in FIG. 1 can be realized, the space arrangement shown in FIG. 1 may already be sufficient. This is the case when the geometry predetermination for a processor is that a calculating unit having a relatively small width is required, that is when a chip having a strong rectangular form is required.

Usually the requirement is that chips having a square form to the largest extent possible are desired.

Figure 2:
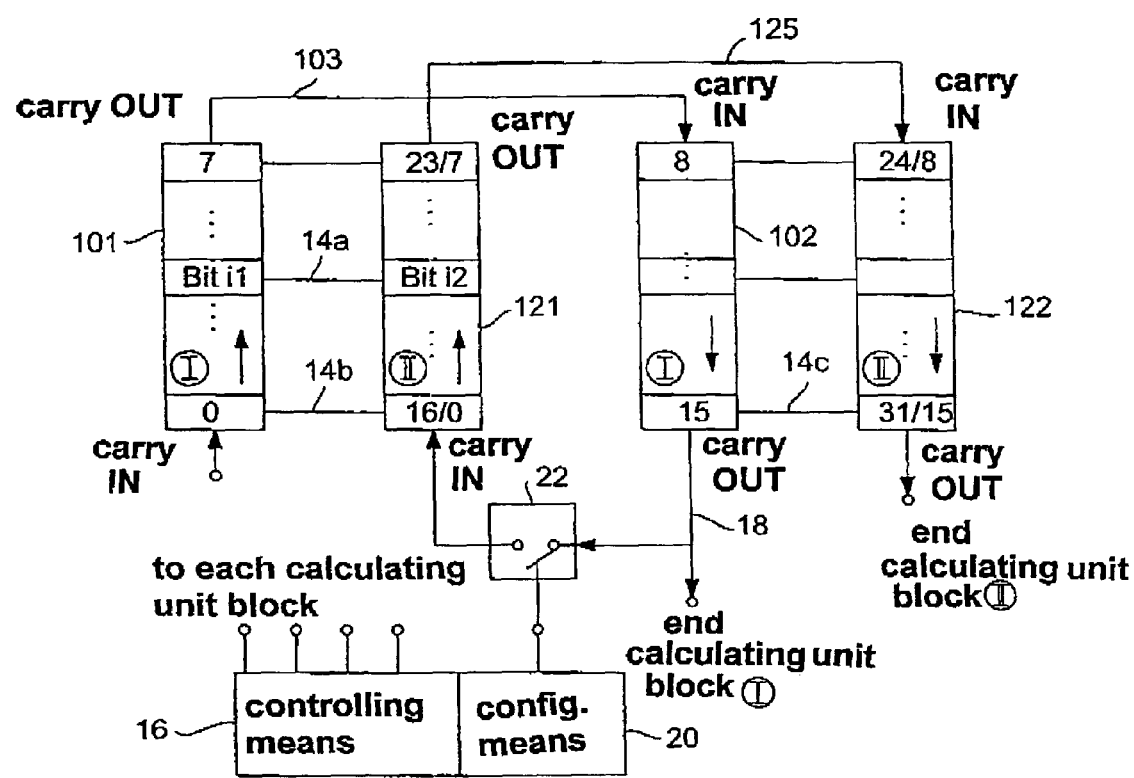
FIG. 2 is block diagram of a preferred arrangement of the inventive calculating unit.
Figure 3:
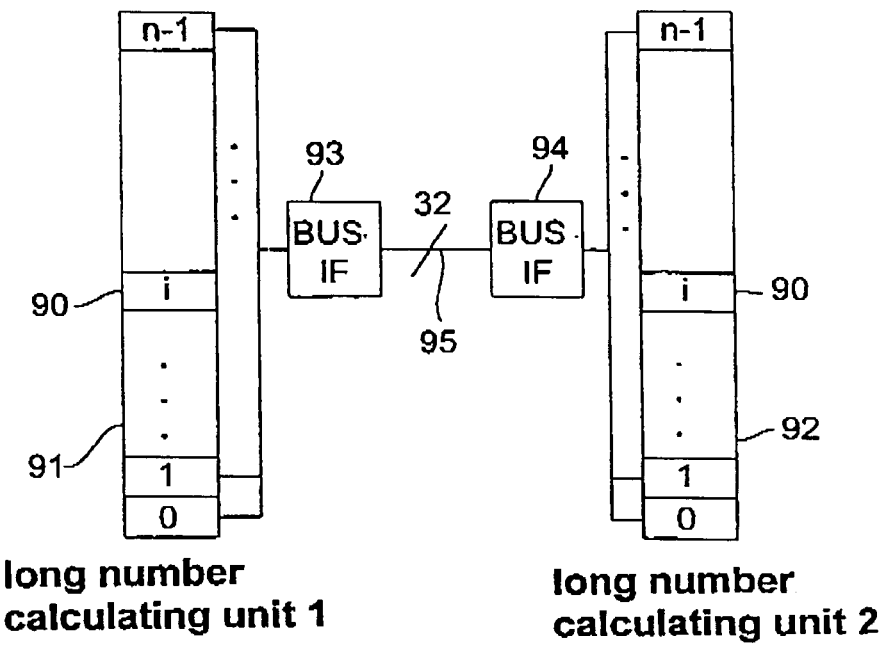
FIG. 3 is a block diagram for performing a register exchange between a first long number calculating unit and a second long number calculating unit by means of a conventional bus system.

For this purpose, reference is now made to the preferred double meander structure shown in FIG. 2. Each calculating unit block is divided into at least two partial calculating unit blocks. In the embodiment shown in FIG. 2, it is assumed for reasons of clarity that the first calculating unit block includes 16 elementary cells and that the second calculating unit block also includes 16 elementary cells and that each calculating unit block is divided into two partial calculating unit blocks each having 8 elementary cells. It is, however, to be pointed out that typical sizes for multipurpose cryptography calculating units require more than 1024 elementary cells per partial calculating unit.

The first partial calculating unit 10 is divided into a first partial calculating unit block 101 and a second partial calculating unit block 102. By way of analogy, the second calculating unit is divided into a first partial calculating unit block 121 and a second partial calculating unit block 122. The first partial calculating unit block 101 and the second partial calculating unit block 102 of the first calculating unit block are interconnected by a partial calculating unit block carry path 103. By way of analogy, the first partial calculating unit block 121 of the second calculating unit block is connected to the second partial calculating unit block 122 of the second calculating unit block (12 in FIG. 1) via a partial calculating unit carry connection 125. The membership of the individual partial calculating unit blocks to the calculating unit blocks shown in FIG. 1 is also made clear by the Roman numerals illustrated in FIG. 2.

In order to ensure short connecting lines in the meandering structure, the two calculating unit blocks are arranged in an interlocking meander structure, as is shown in FIG. 2. Thus, the LSB elementary cell of the first calculating unit block is connected to the LSB elementary cell of the second calculating unit block via the connecting line 14b. The same applies to the elementary cell for the bit i of the first calculating unit block and the elementary cell for the bit i of the second calculating unit block, which are interconnected via the connecting 14a. Finally, the MSB elementary cell of the first calculating unit block and the MSB elementary cell of the second calculating unit block are also interconnected via the connecting line 14c. In the selected embodiment, the significance is indicated in the corresponding elementary cell. The significance of the elementary cells of the first calculating unit block is from 0 (LSB elementary cell) to 15 (MSB elementary cell). The significance of the second calculating unit is from 16 (LSB elementary cell) to 32 (MSB elementary cell), wherein these significance indications are true for the case that the first and second calculating unit blocks are interconnected via the carry line 18 and the switch 22, wherein the switch 22 is kept in a closed state by the configuring means 20.

For the case in which the two calculating unit blocks operate in parallel, there are no changes for the valencies of the elementary cells of the first calculating unit block. Then the valencies of the second calculating unit block are, as is shown in FIG. 2, from 0 to 15.

The controlling means 16 then, as is also shown in FIG. 2, has a control connection to each partial calculating unit block in order to allow a register exchange between elementary cells of the first partial calculating unit block and the second partial calculating unit block via the connecting lines 14a, 14b, 14c.

The interlocking meandering structure of the two calculating unit blocks and, in particular, of the individual partial calculating unit blocks shown in FIG. 2 ensures that the connecting lines between corresponding elementary cells having the same significance are as short as possible. In this respect, a parallel arrangement of the partial calculating unit blocks is advantageous since, in this case, all the connecting lines between the individual elementary cells having the same significance in the two neighboring partial calculating unit blocks have the same length and, all in all, are as short as possible.

It is to be pointed out that the double meandering structure in practice consists of more partial calculating unit blocks than are shown in FIG. 2. In particular, the individual partial calculating unit blocks will, in practice, also include a height which is considerably larger compared to the width. In this case, it is preferred in order to obtain a chip form of an, for example, approximately square form to divide each calculating unit block into more than two partial calculating unit blocks and to arrange them according to the structure shown in FIG. 2 of the interlocking fingers.

Figure 5:
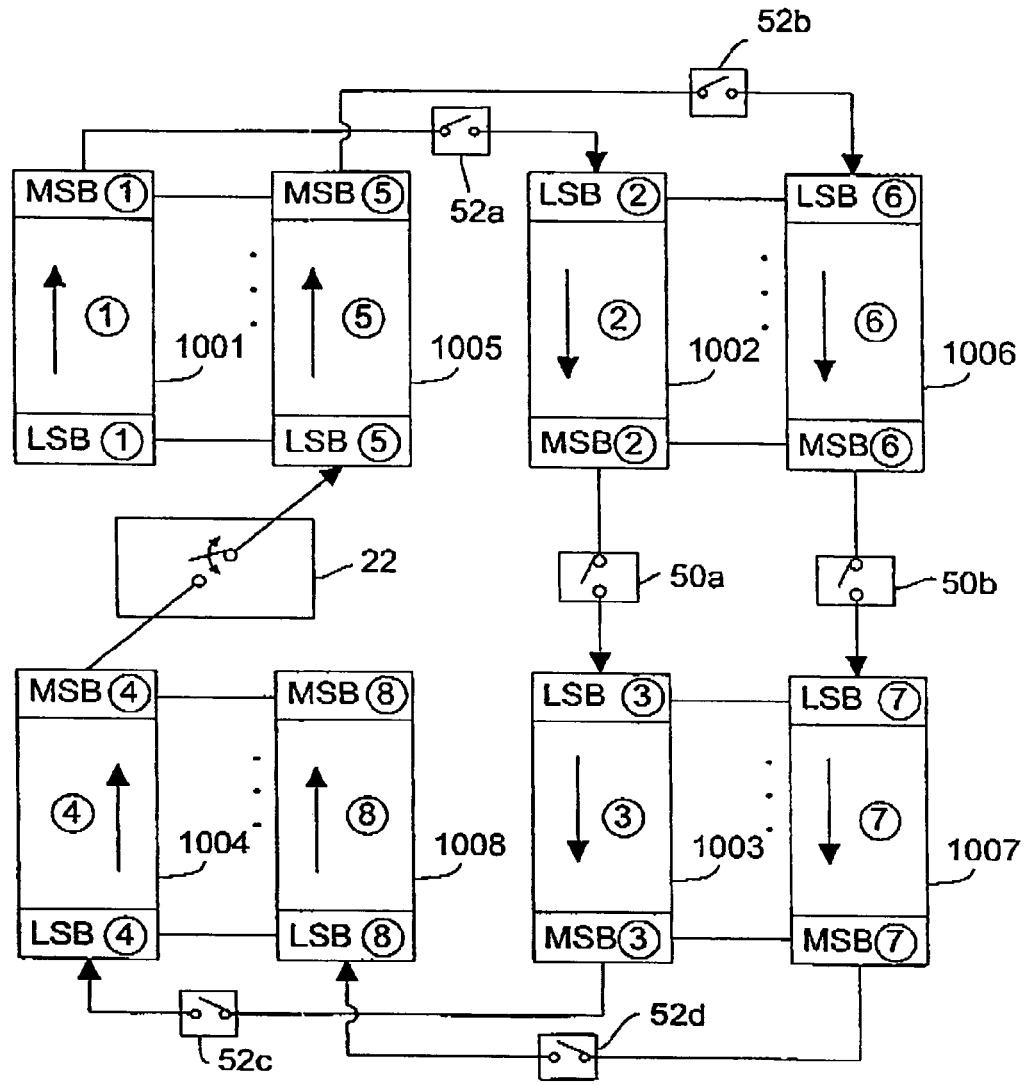
FIG. 5 is a block diagram of a further preferred arrangement of the inventive calculating unit.

FIG. 5 shows a further preferred arrangement of the inventive calculating unit emerging from mirroring the calculating unit shown in FIG. 2 according to a first embodiment of the present invention at a horizontal axis. In particular, the calculating unit shown in FIG. 5 includes two calculating unit blocks, wherein the first calculating unit block consists of the partial calculating unit blocks 1001, 1002, 1003 and 1004, while the second calculating unit block consists of the partial calculating unit blocks 1005, 1006, 1007 and 1008. As is shown in FIG. 5, the MSB of a calculating unit having a lower ordinal number 1 to 7 is always connected to the LSB of a calculating unit having an ordinal number higher by 1. The individual partial calculating unit blocks are connected by connecting lines illustrated in FIG. 5 to illustrate the carry path to be wired from one partial calculating unit block to the next. In the individual partial calculating unit blocks 1001 to 1008, the direction from LSB to MSB of the corresponding partial calculating unit block is illustrated by an arrow.

In FIG. 5, switching means 22 having the same function as the switching means 22 in FIG. 2 is illustrated. When the switch is closed, the calculating unit shown in FIG. 5 functions as a single long number calculating unit having a number of 8×m bits, m being the number of bits of a partial calculating unit block 1001 to 1007 in FIG. 5.

When, however, the switch 22 is open, the arrangement in FIG. 5 functions as two parallel, correspondingly shorter, calculating units. In particular, the first calculating unit block then has the partial calculating unit blocks 1 to 4, while the second calculating unit block then comprises the partial calculating unit blocks 5 to 8. It can also be seen from FIG. 5 that the bits of the same order are arranged close to one another in the two shorter calculating units in such a way that the space distance between an elementary cell of the first calculating unit block and a same significance elementary cell of the second calculating unit block is smaller than a mean distance between the elementary cell of the first calculating unit block and at least two different significance elementary cells of the second calculating unit block.

It is to be pointed out that the mean distance can be calculated by interconnecting all the elementary cells of a calculating unit block, which have different significances with respect to an elementary cell of the other calculating unit block, to the one elementary cell of the second calculating unit block so that the distances of each individual connections are summed up and that the mean value can then be calculated for example by dividing the length resulting by the number of the summed connections. For calculating the mean distance, it is, however, not necessary to sum every possible connection between the two calculating unit blocks and form the mean value thereof. It is rather sufficient to measure a few connections (such as, for example, two) of different significance elementary cells and calculate the mean distance thereof. In any case, the arrangement is such that the transmission paths between same significance elementary cells are short in order for a fast register exchange from one calculating unit block to another calculating unit block to be possible, that is via the elementary cell to elementary cell connections, by which each elementary cell of a calculating unit block is connected to the corresponding other elementary cell of the other calculating unit block of the same order.

It is to be pointed out that the individual partial calculating unit blocks need not be arranged in a precisely parallel way to one another or not such that the distance between two elementary cells of the same order is always smaller than the space distance between an elementary cell of the first calculating unit block and an elementary cell having an order higher by 1 of a second calculating unit block. When, for example, the partial calculating unit block 5 is shifted in the vertical direction by the length of half an elementary cell, an entire or several elementary cells, the inventive effect is still achieved even though the distance between two same significance elementary cells in the partial calculating unit blocks 1001 and 1005 is as large as the distance of an elementary cell of a partial calculating unit block to the elementary cell of the next higher or next lower order of the other partial calculating unit block.

Figure 6:
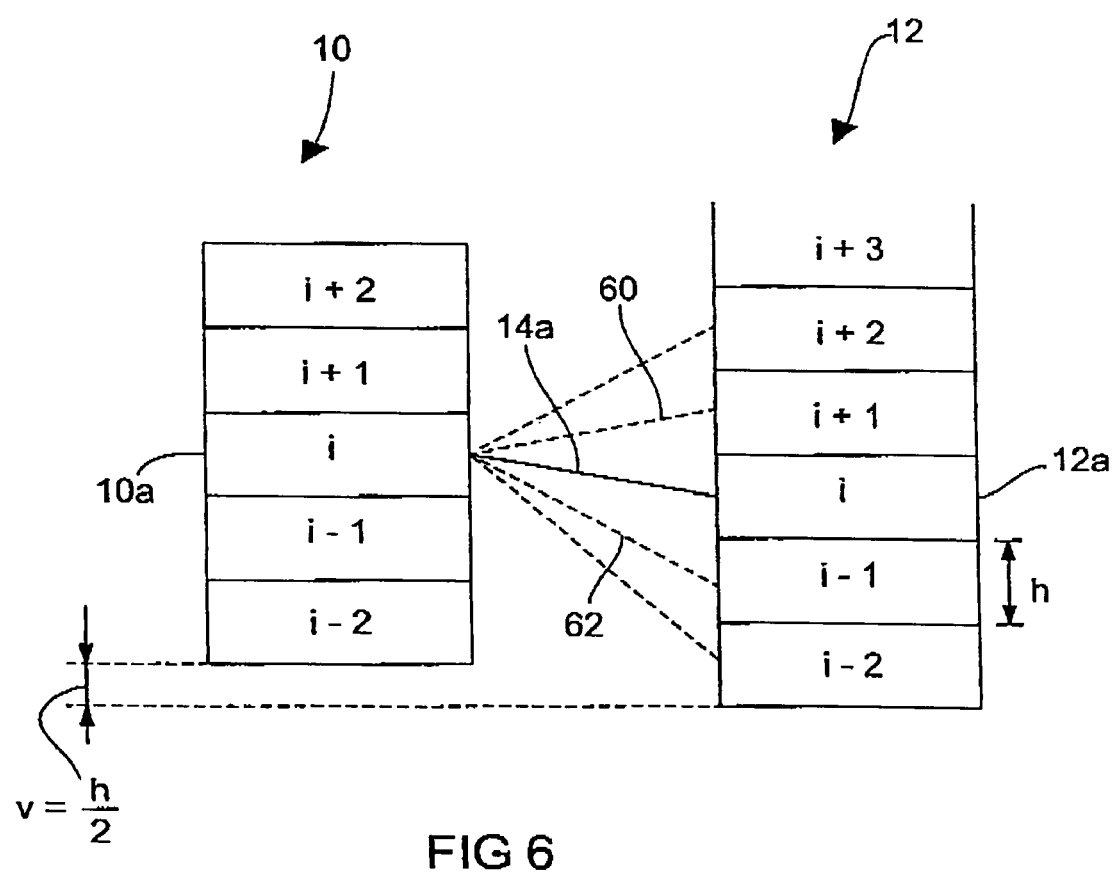
FIG. 6 is a detailed view for illustrating the arrangement of the two calculating unit blocks to each other.

For illustrating these circumstances, reference will be made to FIG. 6. FIG. 6 shows an enlarged part of FIG. 1. On the left-hand side of FIG. 6, the first calculating unit block 10 is shown, that is in particular the elementary cells of the order i+2, i+1, i, i−1, i−2. On the right-hand side in FIG. 6, the second calculating unit block is shown, also with the elementary cells i+3, i+2, i+1, i, i−1, i−2. It is also assumed that the height of each elementary cells in both calculating unit blocks is the same. The height of each elementary cell is designated by h in FIG. 6. In addition, the two calculating unit blocks are not, as is the case in FIG. 1, arranged at exactly the same height but offset by each other by h/2. It is to be pointed out that other offset values are also possible, wherein the shortest connections between the elementary cells of the same order are achieved when the offset v between the two calculating unit blocks equals 0.

The connecting line 14*a* between the two elementary cells of the same order in the two calculating unit blocks is illustrated in FIG. 6 by a continuous line. According to the invention, the two calculating unit blocks are arranged such that the length of the connecting line 14*a* is shorter than the mean distance between the elementary cell i of the first calculating unit block and at least two elementary cells of different orders, that is, for example, the elementary cells of the order i+1 and i−1 and i+1 and i+2, respectively, of the second calculating unit block 2. The distance of the elementary cell 10*a* to the elementary cell of the next higher order in the calculating unit block 12, that is to the elementary cell i+1, is indicated in FIG. 6 by 60. It can be seen from FIG. 6 that this distance is as large as the length of the connecting line 14*a*. It can also be seen from FIG. 6 that the distance between the elementary cell 10*a* of the first calculating unit block and, for example, the elementary cell having the order i−1, which is indicated in FIG. 6 by 62, is already larger than the distance 60. When, for example, the arithmetic mean of the two distances 60 and 62 is calculated, the result is that this arithmetic mean is larger than the length of the connecting line 14*a*.

It is to be pointed out that it is not important for the present invention whether the two calculating unit blocks are rectangular stacks which are arranged parallel to each another. The calculating unit blocks can instead also be rectangular stacks which are arranged with respect to each another in an angle. Alternatively, the calculating unit blocks can also be segments of a circle and the individual elementary cells can be designed in the form of a sector of a circle, that is they need not have a precisely rectangular form. Furthermore, the individual dimensions of the elementary cells need not have the same size, even though this is preferred for the purpose of a simpler circuit design and a simpler routing.

Any inventive calculating unit, however, has the advantage that elementary cells of the same order are arranged such that short connecting lines can be used in order to be able to achieve a quick completely parallel data exchange between registers of the elementary cells of the two calculating unit blocks when the two calculating unit blocks operate as calculating units separated by each other.

It is also to be pointed out that the calculating unit arrangement shown in FIG. 5 can also be operated such that four individual calculating units operate in parallel. This is obtained by including further switches 50*a*, 50*b* between the partial calculating unit blocks 1002 and 1003 and the partial calculating unit blocks 1006 and 1007, respectively. In this case there are four shorter calculating units independent of one another, that is the first calculating unit consisting of the partial calculating unit blocks 1 and 2, the second calculating unit consisting of the partial calculating unit blocks 5 and 6, the third calculating unit consisting of the partial calculating unit blocks 3 and 4 and the fourth partial calculating unit consisting of the partial calculating unit blocks 1007 and 1008.

It can be seen from FIG. 5 that the four calculating units are also arranged such that a quicker register exchange between respective two individual calculating units is possible.

When in addition, as is shown in FIG. 5, switches 52*a* to 52*d* are included into the corresponding carry lines, the calculating unit arrangement shown in FIG. 5 can also be employed easily as eight separate calculating units, wherein each calculating unit has a number of elementary cells equaling the number of elementary cells in a partial calculating unit block 1001 to 1007.

It can be seen from FIG. 5 that the inventive calculating unit in a meandering structure is scalable to an optimum extent. It can function as a long number calculating unit, by opening the switch 22 it can also act as two short calculating units. By opening the switches 50*a*, 50*b*, wherein the switch 22 is also open, the calculating unit can function as four short calculating units, wherein by opening the switches 52a to 52d eight individual calculating units can be obtained, whereby a quick data exchange between two neighboring calculating units is possible by the connecting lines.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A calculating unit comprising:
   a first calculating unit block comprising a first plurality of elementary cells including an LSB elementary cell for a least significant bit of a first operand and an MSB elementary cell for a most significant bit of the first operand, each elementary cell of the first calculating unit block comprising at least one register cell for storing a bit of the first operand or a result bit calculated by the elementary cell, the first calculating unit block comprising at least four partial calculating unit blocks;
   a second calculating unit block comprising a second plurality of elementary cells including an LSB elementary cell for a least significant bit of a second operand and an MSB elementary cell for a most significant bit of the second operand, each elementary cell of the second calculating unit block comprising a register cell for storing a bit of the second operand or a result bit calculated by the elementary cell, the second calculating unit block comprising at least four partial calculating unit blocks,
   wherein the first and second calculating unit blocks are arranged with respect to each other in space such that a spacial distance between an elementary cell of the first calculating unit block and a same significance elementary cell of the second calculating unit block is smaller than a mean distance between the elementary cell of the first calculating unit block and different significance elementary cells of the second calculating unit block,
   wherein a partial calculating unit block of the second calculating unit block is arranged between two partial calculating unit blocks of the first calculating unit block, and wherein a direction from a least significant elementary cell to a most significant elementary cell of the partial calculating unit block of the second calculating unit block is the same direction as a least significant elementary cell to a most significant elementary cell of a neighboring partial calculating unit block of the first calculating unit block,
   wherein the direction from the least significant elementary cell to a most significant elementary cell of the partial calculating unit block of the second calculating unit block is opposite to a direction from a least significant elementary cell to a most significant elementary cell of the other neighboring partial calculating unit block of the first calculating unit, and
   connector having a number of connecting lines equaling the number of elementary cells in a calculating unit block, wherein a connecting line connects the at least one register cell of an elementary cell having a significance of the first calculating unit block to a register cell of an elementary cell having the same significance of the second calculating unit block, wherein the connecting lines are arranged between the two partial calculating unit blocks having the same direction from the least significant elementary cell to the most significant elementary cell of the partial calculating unit blocks; and
   controller for loading contents of the register cells of a calculating unit block via the number of connecting lines into the register cells of the other calculating unit block.

2. The calculating unit according to claim 1, further comprising:
   a switchable carry line for connecting a carry output of the MSB elementary cell of the first calculating unit block to a carry input of the LSB elementary cell of the second calculating unit block; and
   configuring unit that connects through the switchable carry line to configure the first and second calculating unit blocks as a single calculating unit so that the first operand and the second operand can be treated as an overall operand, wherein the first calculating unit block is provided for low significance digits of the overall operand, and wherein the second calculating unit block is provided for higher significance digits of the overall operand.

3. The calculating unit according to claim 2,
   wherein each partial calculating unit block has a geometrically lateral dimension and a geometrically vertical dimension, and
   wherein each partial calculating unit block is arranged essentially in parallel to other partial calculating unit blocks so that a window in which a partial calculating unit block of the first calculating unit block and a partial calculating unit block of the second calculating unit block are arranged in an alternating way results.

4. The calculating unit according to claim 1,
   wherein the first calculating unit block is divided into at least two partial calculating unit blocks arranged in a spaced-apart manner, wherein a carry output of an MSB elementary cell of the first partial calculating unit block is connected to a carry input of an LSB elementary cell of the second partial calculating unit block,
   wherein the second calculating unit block is divided into two partial calculating unit blocks arranged in a spaced-apart manner, wherein a carry output of an MSB elementary cell of the first partial calculating unit block is connected to a carry input of an LSB elementary cell of the second partial calculating unit block,
   wherein the first partial calculating unit block of the first calculating unit block is arranged next to the first partial calculating unit block of the second calculating unit block, and
   wherein the second partial calculating unit block of the first calculating unit block is arranged next to the second partial calculating unit block of the second calculating unit block.

5. The calculating unit according to claim 4,
   wherein an LSB elementary cell of the first partial calculating unit block of the first calculating unit block is arranged in space next to an LSB elementary cell of the first partial calculating unit block of the second calculating unit block,
   wherein the MSB elementary cell of the first partial calculating unit block of the first partial calculating unit is arranged in space next to the MSB elementary cell of the first partial calculating unit block of the second calculating unit block, wherein the LSB elementary cell of the second partial calculating unit block of the first partial calculating unit is arranged in space next to the LSB elementary cell of the second partial calculating unit block of the second calculating unit block, and wherein an MSB elementary cell of the second partial calculating unit block of the first calculating unit is arranged in space next to an MSB elementary cell of the second partial calculating unit block of the second calculating unit block.

6. The calculating unit according to claim 4,
wherein the number of elementary cells in each partial calculating unit block of the first and second calculating unit blocks is the same.

7. The calculating unit according to claim 1,
wherein each elementary cell comprises at least two input operand register cells and a result register cell, and
wherein each elementary cell is formed to load contents of the result register cell into an input operand register cell of the same elementary cell.

8. The calculating unit according to claim 1,
wherein each elementary cell comprises at least two input operand register cells and a result register cell,
wherein the controller is arranged to load contents of a result register cell of the first calculating unit block into an input operand register cell of the second calculating unit block via a connecting line associated with the elementary cell having the same significance, and
wherein the controller is arranged to load contents of a result register cell of the second calculating unit block into an input operand register cell of the first calculating unit block via a connecting line associated with the elementary cells having the same significance.

9. The calculating unit according to claim 1, formed as a long number calculating unit.

10. The calculating unit according to claim 9, wherein the first calculating unit block has more than 160 elementary cells, and wherein the second calculating unit block also has more than 160 elementary cells.

11. The calculating unit according to claim 1,
wherein between a partial calculating unit block of the first calculating unit block and a partial calculating unit block of the second calculating unit block a configuring switch is arranged, which, in an open position, configures the first and second calculating unit blocks to be calculating units independent of each other.

12. The calculating unit according to claim 1,
wherein switches between respective two partial calculating unit blocks of a calculating unit block are present, wherein the switches, in an open position, configure four calculating units independent of one other from the first and second calculating unit blocks, of which each comprises two partial calculating unit blocks.

13. The calculating unit according to claim 1,
wherein switches separate all of the partial calculating unit blocks from one another such that the calculating unit in an open position of the switches is configurable into eight calculating units independent of one another.

* * * * *